O. B. RONEY.
PROCESS OF CUTTING PATTERNS FROM SHEET MATERIAL.
APPLICATION FILED NOV. 24, 1915.
1,196,986.
Patented Sept. 5, 1916.
4 SHEETS—SHEET 1.
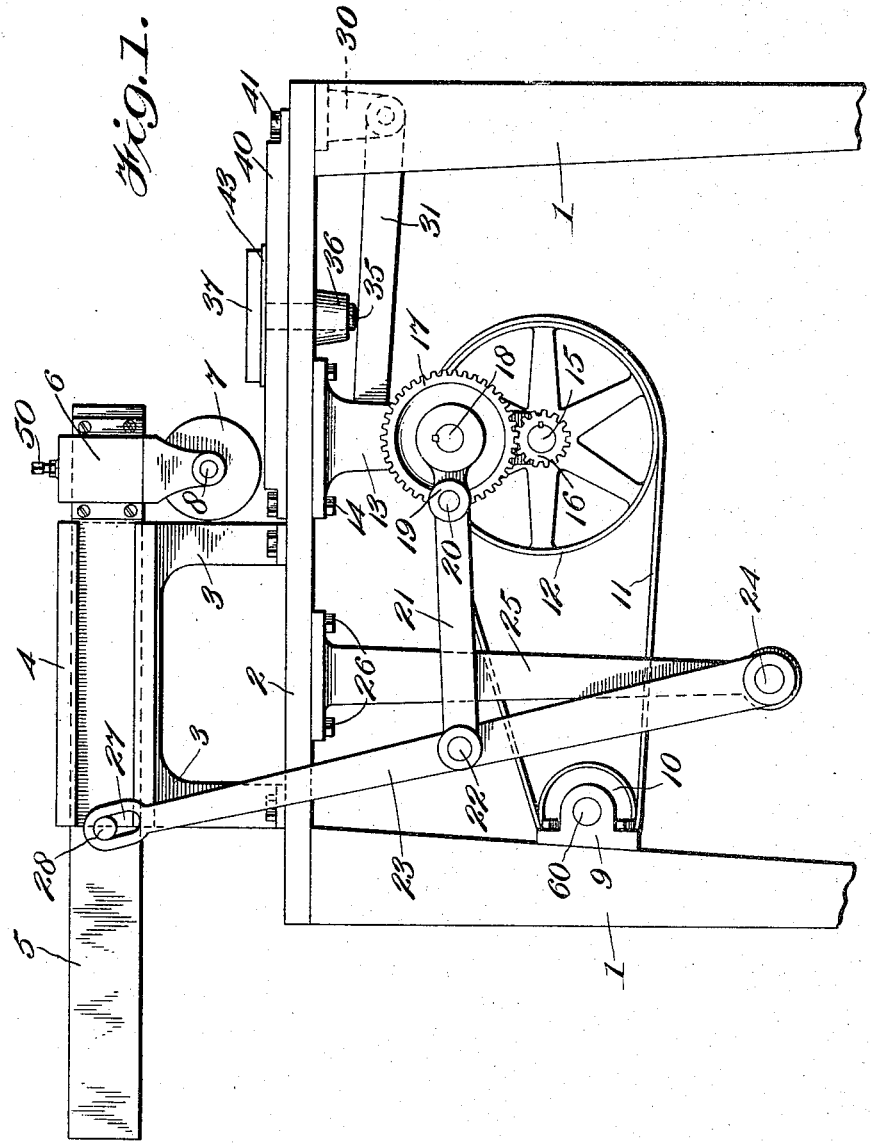
Inventor
Oscar B. Roney.
Witness
By
Attorney

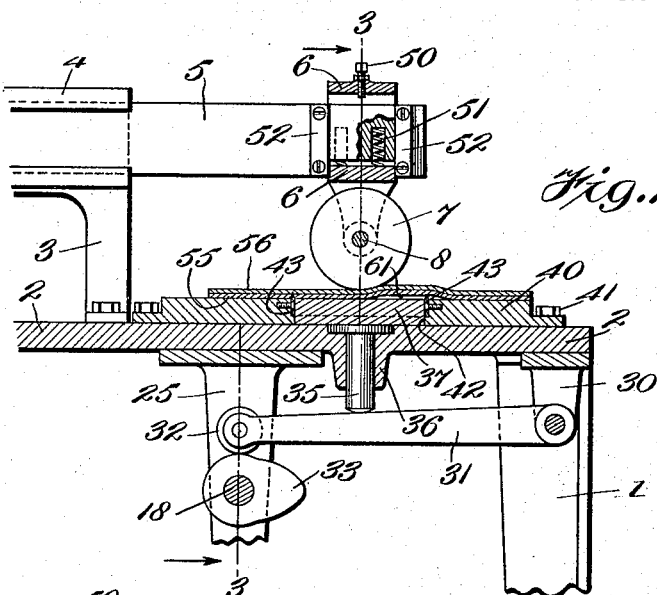
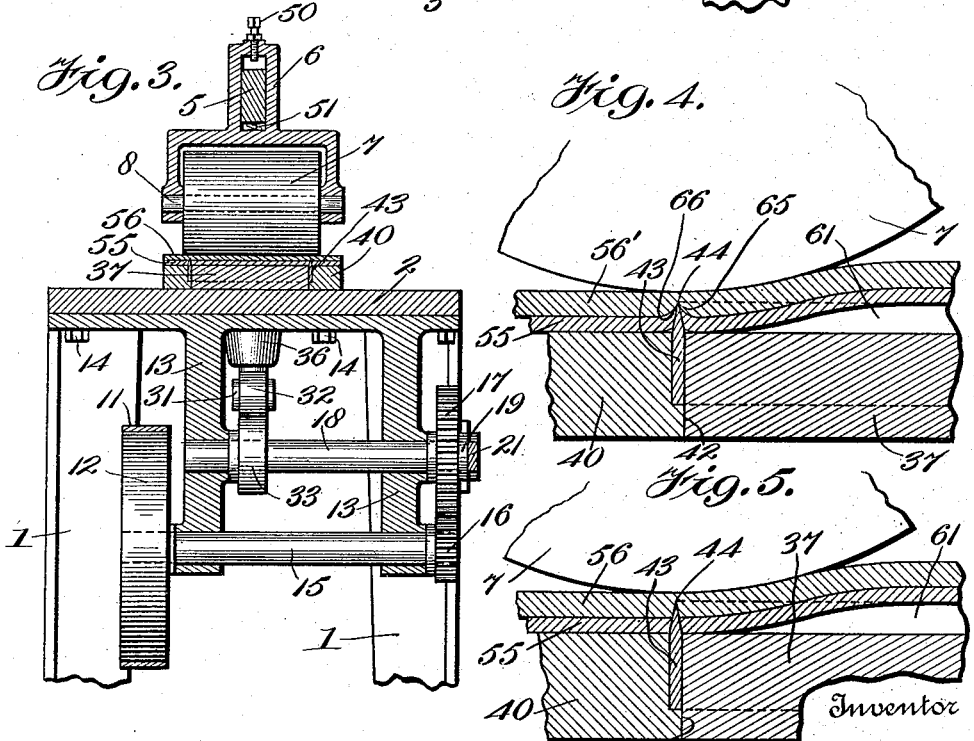

O. B. RONEY.
PROCESS OF CUTTING PATTERNS FROM SHEET MATERIAL.
APPLICATION FILED NOV. 24, 1915.
1,196,986.
Patented Sept. 5, 1916.
4 SHEETS—SHEET 3.
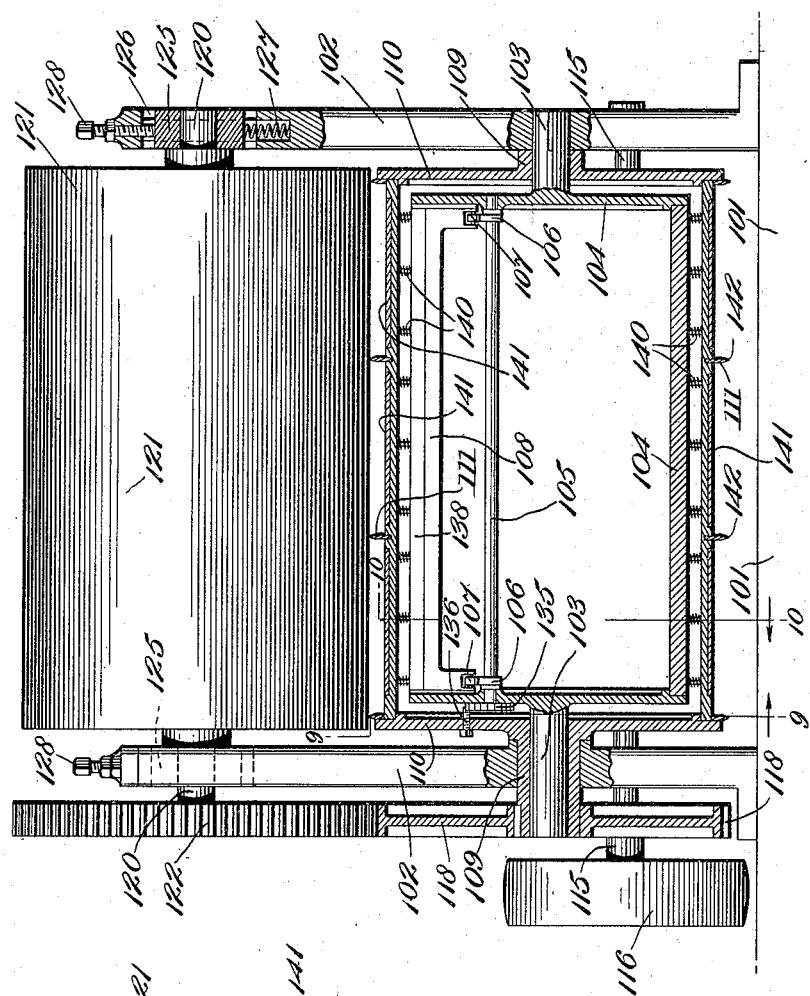
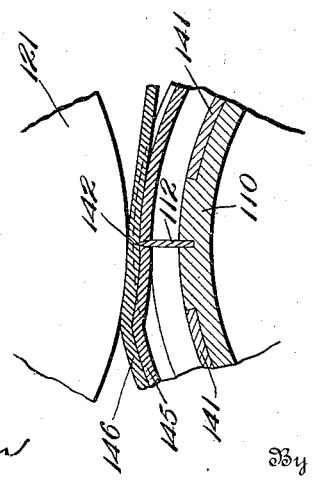
Inventor
Oscar B. Roney.
Witness
By
Attorney

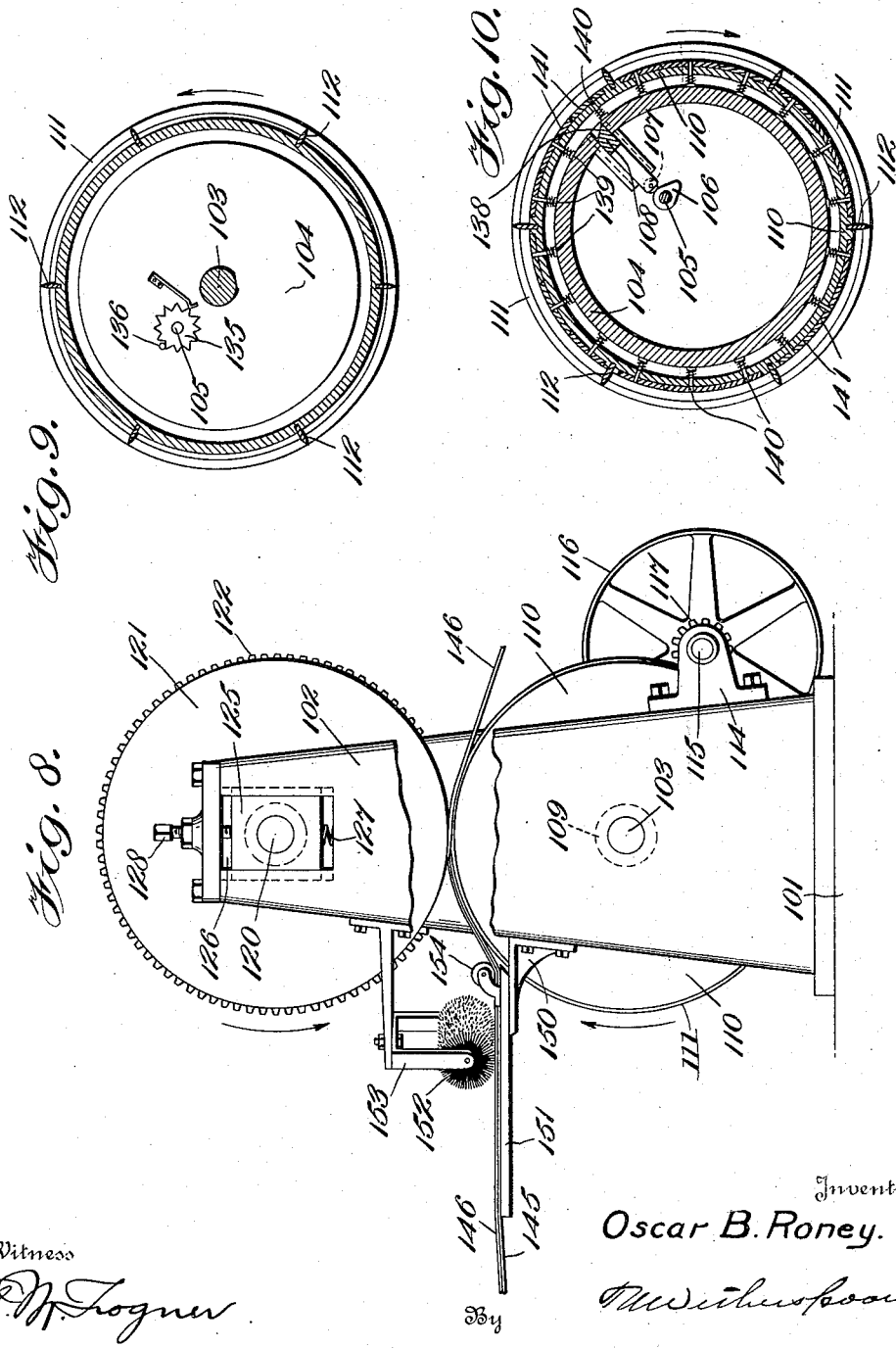

UNITED STATES PATENT OFFICE.

OSCAR B. RONEY, OF OLNEY, ILLINOIS.

PROCESS OF CUTTING PATTERNS FROM SHEET MATERIAL.

1,196,986.  Specification of Letters Patent.  Patented Sept. 5, 1916.

Application filed November 24, 1915. Serial No. 63,281.

*To all whom it may concern:*

Be it known that I, OSCAR B. RONEY, a citizen of the United States, residing at Olney, in the county of Richland and State of Illinois, have invented certain new and useful Improvements in Processes of Cutting Patterns from Sheet Material; and I do hereby declare the following to be a full, clear, and exact description of the invention, such as will enable others skilled in the art to which it appertains to make and use the same.

This invention relates to a process of cutting patterns from leather and other sheet material and has for its object to provide a method which will be speedy in operation and more accurate than those heretofore proposed.

With these and other objects in view the invention consists in the novel combinations of steps more fully hereinafter disclosed and particularly pointed out in the claims.

Referring to the accompanying drawings forming a part of this specification, in which like numerals designate like parts in all the views, Figure 1 is a diagrammatic side elevational view of a machine capable of carrying out the process; Fig. 2 is a sectional detail view partly in elevation of a portion of the parts shown in Fig. 1; Fig. 3 is an end view in section, taken on the line 3—3 of Fig. 2 and illustrating the parts shown in said figure; Fig. 4 is an enlarged diagrammatic partly sectional view illustrating the operation of the machine when a soft protecting sheet is employed; Fig. 5 is a view similar to Fig. 4 illustrating the operation when a firm protecting sheet is employed; Fig. 6 is an elevational view partly in section of a modified form of machine capable of carrying out the invention; Fig. 7 is a view similar to Fig. 5 illustrating the operation of the machine shown in Fig. 6; Fig. 8 is an end elevational view of the parts shown in Fig. 6; Fig. 9 is a cross sectional view of the lower drum shown on the line 9—9 of Fig. 6 and illustrating the means for forcing out the patterns after a predetermined number have been cut; and Fig. 10 is a cross sectional view of the lower drum taken on the line 10—10 of Fig. 6 showing the details of the pattern ejecting mechanism.

1 indicates any suitable supports on which is mounted the table or base 2 carrying the brackets or supports 3 having the guide members 4 between which the bar 5 reciprocates. Suitably mounted on the bar 5 as by means of the member 6 is a cutting roller 7 pivoted to said member 6 as at 8. Conveniently mounted on the supports 1 are the journals or brackets 9 carrying a roller 10 around which the belt 11 passes. Said belt also passes around the pulley 12 journaled in the supports or brackets 13 bolted as at 14 to the table 2 and provided with the shaft 15 as shown.

16 represents a pinion rigid with the shaft 15 meshing with the gear 17, mounted on the shaft 18, journaled in said brackets 13 and carrying the crank arm 19 to which is pivoted as at 20 the link 21 pivoted as at 22 to the operating lever 23 pivoted as at 24 to the depending bracket 25 secured as at 26 to the said table or base 2. The upper end of the said lever 23 is conveniently slotted as at 27 and engages a pin 28 rigid with the reciprocating bar 5, all as will be clear from the drawings. Also, pivotally mounted on the bracket 30 depending from the table 2 is an operating lever 31 carrying at its outer end the roller 32 adapted to be operated by the cam 33 carried by the said shaft 18. Normally resting on the lever 31 is the reciprocating plunger 35 passing through a perforated boss 36 carried by the table 2 and carrying at its upper end a block 37 adapted to reciprocate with said plunger 35. Also, mounted on the table 2 is a plate 40 secured to said table as by the bolts 41, and provided with a perforation or orifice 42 into which said block 37 fits. Located on the outer surface of said orifice 42 and firmly secured to said plate 40 are the knives or dies 43 of any suitable shape, the upper sharpened edges 44 of which project a slight distance above the upper surface of said plate 40. The cutting roller 7 is adapted to reciprocate above the upper edges 44 of said knives 43, and, the parts are so adjusted that said roller passes only a very small fraction of an inch above said edges 44 but out of contact therewith. In order to properly adjust the distance between the said roller 7 and the upper edges 44 of said knives 43, there is provided in the member 6 the adjusting screw 50 adapted to raise said roller 7, and conveniently located in said member 6 and in pockets in said reciprocating bar 5 are the springs 51 adapted to lower said roller 7 when the said adjusting screw 50 is slacked off. The member 5 may be conveniently provided with slide ways 52 to facilitate the said adjustment.

55 represents the leather or other sheet material it is desired to cut, and 56 represents a sheet of paper or other material which overlies said leather 55 and receives the edges 44 of the knives after they pass through the said leather 55.

The operation of the mechanism so far disclosed may be briefly summarized as follows: Power being applied by any suitable means, not shown, to the shaft 60 on which is mounted the pulley or pulleys 10, the said power is transmitted by the belt 11 to the pulley 12, thence to the shaft 15, the pinion 16, the gear 17, and to the shaft 18. From the shaft 18 power is transmitted to the crank 19, the link 21 and the lever 23, which serves to reciprocate the bar 5 and the cutting roller 7. The knives or dies 43 are of any suitable shape or pattern, and when the roller 7 is in one of its extreme positions, such as is illustrated in Fig. 1, for example, the leather or other sheet material 55 is spread down over the plate 40, together with the paper sheet 56 overlapping the said leather 55. The screw 50 is so set that when its lower end is in contact with the upper edge of the bar 5, the lower surface of the roller 7 will rest above the upper edges 44 of the knives a distance equal to say about one half the thickness of the protecting sheet 66. The parts being set as just described, when the roller 7 meets the two sheets 55 and 56 it will rise against the compression of the springs 51, thus raising the screw 50 out of contact with the upper edge of the bar 5. But as the said roller passes over the edges 44 of the knives, the springs 51 will press the said edges 44 entirely through the sheet 55 and partially through the sheet 56 thus completely severing the sheet 55 as indicated in Fig. 5.

The material of the sheet 55 will thus be cut into any desired predetermined pattern, such for example as a portion of a glove and the pattern thus severed from the sheet 55 will rest down in the space 61 between the knives, while the sheet 56 and the remainder of the sheet 55 can be readily removed by hand after the roller 7 has passed over the knives 43. The parts are so timed that when the roller 7 is performing its cutting operation the lever 31 is in its lowest position, as indicated in Fig. 2, but after the said roller has completed its cutting operation the lever 31 will be lifted by the cam 33 and the plunger member 37 will thereupon force the cut out pattern from between the knives 43, so that the sheet 55 can be replaced over said knives and a new pattern be cut therefrom.

It will thus be seen that the operation of the machine may be continuous or intermittent according to the control of the power and that the patterns may be cut as fast as sheets 55 are placed in position over the knives. It will also be seen that since the cutting roller 7 never contacts with the cutting edges 44 of the knives, the said edges are protected from contact with the metal roller 7 and therefore the said knives are not dulled due to metal coming in contact with metal.

It is an important feature of this invention that a protecting sheet of material, such as 56 is provided over the leather sheet 55, so as to prevent the edges of the knives being dulled by the said cutting roller 7. It is further of importance that the texture of the sheet 56 be selected with reference to the character of the material 55 to be cut. In other words, if a clean smooth sharp edge is to be had on the cut out pattern, the texture of the sheet 56 should be firm, and of such a nature that when the cutting edges 44 enter the same the material of the leather sheet 55 will not be carried up into the body of the protecting sheet 56, which would be the case if said sheet 56 were made of soft yielding material 56', (see Fig. 4), such as felt or a poor quality of blotting paper for example. I have found in actual practice that if kid glove patterns are to be cut out, a calendered paper material of about the quality that file jackets or file envelops are usually made is very satisfactory in that it presents a smooth and firm surface and the knives make a clean cut into its body without any of the kid material being carried thereinto whatever. Substantially the same operation is had when materials other than leather are employed. For example, cloth patterns may be cut in the same manner, as well as rubber patterns and in fact any patterns that are usually made from sheet material.

It will be appreciated by those skilled in the art, that by cutting out the patterns thus singly I avoid the objections of lack of uniformity in size which have heretofore existed in the cutting out of a plurality of patterns at the same time, and wherein the cutting knives must of necessity pass through a plurality of thicknesses. In other words, it is well recognized by those skilled in the art that in such cases the upper patterns are of a different size from the lower patterns and that inaccuracy in the paterns, as well as other objections, due to ragged edges inevitably result. On the other hand, by cutting out single patterns as above described, not only is extreme uniformity as to size obtained, but clean cut edges and a very high rapidity of operation is also attained while the knives are not dulled through contact of metal with metal.

Stated in still other language it will now be understood that in cutting patterns of considerable size, as those for shoes or gloves for example, and from which an accurately fitting article is to be made, it is of great importance that the edges of the patterns be cut clean and sharp, for otherwise, the resulting article will not be sightly, or give a neat fit. It is largely for these reasons that multiple patterns of this nature cannot be successfully and simultaneously cut from multiple layers of the goods, but are now usually cut out by hand from a single layer. This is accomplished, usually, by driving a suitably shaped die down through a single thickness of the goods. But even this practice aside from its slowness has its objections, for in making patterns of the required sizes the goods must be carefully smoothed out, and difficulty is found in causing the entire edges of the die to descend uniformly and make a clean sharp cut all around the pattern. To overcome this last named difficulty it is usual to drive the die through the goods with sufficient force to insure that all the edges pass entirely through the material being cut. But this, not only takes time and power but it also rapidly dulls the die, for some parts are unavoidably often driven quite deeply into the wooden backing. In fact, these and other objections to the present method of forming glove and other like patterns, are so well recognized that a shear cutting action is greatly desired by the trade.
In the process made the subject of this application it will be seen that the roller 7 first compresses the sheets 55 and 56 against the compression of the springs 51 before the cutting edges 44 of the dies are reached, and it therefore smoothes out said sheets. It will also be seen that as said roller continues to advance it continues to smooth out the material, and thus insures an accurately uniform area in each pattern cut out, which is another important feature of this invention.

It will further be seen that the roller 7 first compresses the sheets 55 and 56 over one portion of the cutting edges 44 and then successively and progressively compresses said sheets over other portions of said edges, thus cutting out portions of the pattern edges one at a time. In fact, as the pressure of the roller 7 progresses over the sheets from one portion of the cutting edges 44 to another portion thereof, the cutting is continuous, and very similar to a shear action, all as will be clear from Fig. 5. This shear like action is more apparent when a firm calendered sheet of paper 56 is employed to protect the said edges, than when a softer sheet such as 56' is employed, for as will be apparent from Fig. 4, a soft sheet 56' will not only be pushed in as illustrated at 65, but the edges of the material 55 will be pushed out as indicated at 66, thus form-ing a more or less ragged and inaccurate edge for the pattern. These objections are found to be entirely absent when a firm calendered surface for the sheet 56 is employed.

Coming now to the modified form of machine shown in Figs. 6 to 10, its structure and operation is or may be the same as that disclosed in my copending applica-tion No. 43964, filed August 5, 1915, entitled Apparatus for cutting sheet mate-rial. In such machine 101 indicates any suitable base or support, 102, suitable stand-ards rising therefrom, 103 short stub shafts fixed in said standards and carrying the stationary drum or cylinder 104. Rotatably mounted in the ends of the drum 104 is the shaft 105 provided with the pair of cams 106 adapted to take against the rollers 107 carried by the ejecting bar 108 adapted to move in and out of a slot with which the wall of the drum 104 is provided. 109 represents the hollow shafts or journals of an outer drum 110 which incloses the drum 104, one of which journals 109 is mounted in one of the stationary standards 102 and both of which surround the stationary short shafts 103 as will be readily understood. Around the circumference of the drum 110 are arranged a plurality of cutting knives or dies 111, and at an angle to the said knives 111 are arranged a second set of knives 112, the two sets of knives 111 and 112 forming any desired and suitably shaped pattern or die. 114 represents brackets attached to the supports 102 and 115 a shaft mounted on said brackets, carrying the power pulley 116 and the gear or pinion 117 meshing with the gear 118, meshing with the gear 112, mounted on the shaft 120 and carrying the drum 121, as will be clear from the drawings. The shaft 120 is mounted in the movable blocks 125, adapted to slide up and down the ways 126 with which the standards or supports 102 are provided, and said blocks are normally supported by the springs 127 as shown. Screws or other adjusting means 128 are adapted to adjust the blocks 125 against the action of the spring 127, and to thereby bring the lower surface of the cylinder or drum 121 within a very small predetermined fraction of an inch of the cutting knives 111 and 112, as will be more fully disclosed below. To one end of the shaft 105 is secured the toothed wheel 135 preferably provided with twelve teeth and rigid with one end of the drum 110 and projecting into the path of said teeth is the pin or other means 136, adapted to turn the wheel 135 one tooth for each revolution of the drum 110. The turning of the wheel 135, of course, turns the shaft 105 and with it the cams 106, so that when the drum 110 has made twelve revolutions the said cams 106 will have made one complete revolution and the said ejector bar

108 will have moved up and down in its slot as will be clear from Figs. 6, 9 and 10. When the upper beveled edge 138 of the ejector bar has been thus moved beyond the outer surface of the drum 104 and into the path of the spring pressed inner ends 139 of the ejector rods 140, said ejector rods will, as the drum 110 revolves, be forced radially outward and carry with them the ejector, or follower strips 141 thereby forcing out of the space between the knives 111 and 112 any pattern or other shapes, that may have been cut by the operation of the machine to be described below. In order to prevent the hard metal surface of the drum 121 from contacting with the outer sharpened edges 142 of the knives 111 and 112, the said cylinder 121 is carefully adjusted by means of the screws 128 so that its outer surface will approach to within a distance of the cutting edges 142, less than the thickness of two sheets of material, but not sufficiently close to contact with said edges as will now be more fully disclosed. The sheet material 145 such as cloth, leather or rubber to be cut, if fed over the surface of the knives 111 and 112 and in order to protect the edges 142 of said knives while at the same time permitting the pressure from the cylinder to cause said edges 142 to pass entirely through the sheet 141, I feed over the said edges 142 along with said sheet 145, a protecting sheet of paper 146 or other suitable material, and I adjust the distance between the cylinder 121 and the edges 142 so that the said edges 142 will pass entirely through the sheet 145, but will only pass partially through the sheet 146 as is best illustrated in Fig. 7. In order to facilitate the feeding of the sheet material I provide on the standards 102 the brackets 150 and secure to said brackets 150, the feed table 151 over which the sheets 145 and 146 may be passed as illustrated in Fig. 8. A pressure roller 152 supported, as by the brackets 153, is preferably mounted so as to contact with the superposed sheet 146, and said roller 152 is also preferably so mounted that it presses at an angle to the line of travel of said sheet, and thereby more effectually smoothes out the edges of the same. The said sheets 145 and 146 are further preferably caused to pass under the roller 154 just before the cutting dies or knives are reached, so as to hold the two sheets in proper relation to each other and to said knives.

The operation of this modified form of the invention will be clear from the foregoing, but may be briefly summarized as follows:—The dies or knives 111 and 112 being suitably shaped to cut out the desired pattern, the sheet material 145 such as kid, leather, cloth, etc., is brought to the table 151, whereupon the protecting sheet 146 is laid thereover, and the two sheets fed to the machine as illustrated in Fig. 8. The cylinder 121 being carefully adjusted by the means 128 so that the distance between the lower surface of said cylinder and the upper edge 142 of the knives will be less than the combined thicknesses of the sheets 145 and 146, and also preferably less than the thickness of the sheet 146 upon rotating the drums 110 and 121, the edges of the said knives 111 and 112 will progressively enter the said sheets 145 and 146 cutting entirely through the sheet 145 and partially through the sheet 146, thus simulating a shear cut and without the said edges 142 coming in contact with the said roller 121. The patterns thus produced from the sheet 145 will be accurately uniform in size and will occupy the space between the knives 111 and 112 immediately above the follower plates or strips 141. The patterns will be thus cut from the sheet 145 as long as the two sheets 145 and 146 are fed to the machine and when a predetermined number of patterns, twelve in this instance, have been thus cut they will be ejected by the follower plates 141 from the space between the knives through the operation of the cams 106 and the ejector bar 108 as above described.

It will thus be seen in both forms of machine I provide for the firm compression together of the pattern and protecting sheets, for the smoothing out of the same to insure accurately uniform areas in each pattern, and that successive portions of the pattern edges are successively and continuously cut against the smooth firm surface of the protecting sheet so that clean sharp edges are had.

It is obvious that those skilled in the art may vary the mechanism by which the above results are attained, and in fact that a variety of mechanisms may be employed for carrying out this process.

What I claim is:—

1. The process of cutting patterns from a sheet of material which consists in applying to said sheet a protecting sheet; causing said first named sheet to contact with the cutting edges of a die; subjecting successive portions of the two sheets thus located to a yielding smoothing and compressive action on each side of said cutting edges, thereby causing successive portions of said cutting edges to pass entirely through said first named sheet in its smoothed condition, and to enter said protecting sheet; and preventing said edges from passing entirely through said protecting sheet, substantially as described.

2. The process of cutting patterns from a sheet of material which consists in causing successive portions of said sheet to contact on one side with successive portions of the cutting edges of a die and on its other side with a protecting sheet having a firm surface; causing successive portions of said two sheets to be subjected to a yielding compressing and smoothing action on each side of said cutting edges and sufficient to cause said portions of said cutting edges to successively pass entirely through said first named sheet and partially through said protecting sheet; and preventing said edges from passing entirely through said protecting sheet, substantially as described.

In testimony whereof I affix my signature in presence of two witnesses.

OSCAR B. RONEY.

Witnesses:
 JUEL McCANN,
 BLANCHE LE SURE.

Copies of this patent may be obtained for five cents each, by addressing the "Commissioner of Patents, Washington, D. C."